Figure 1:
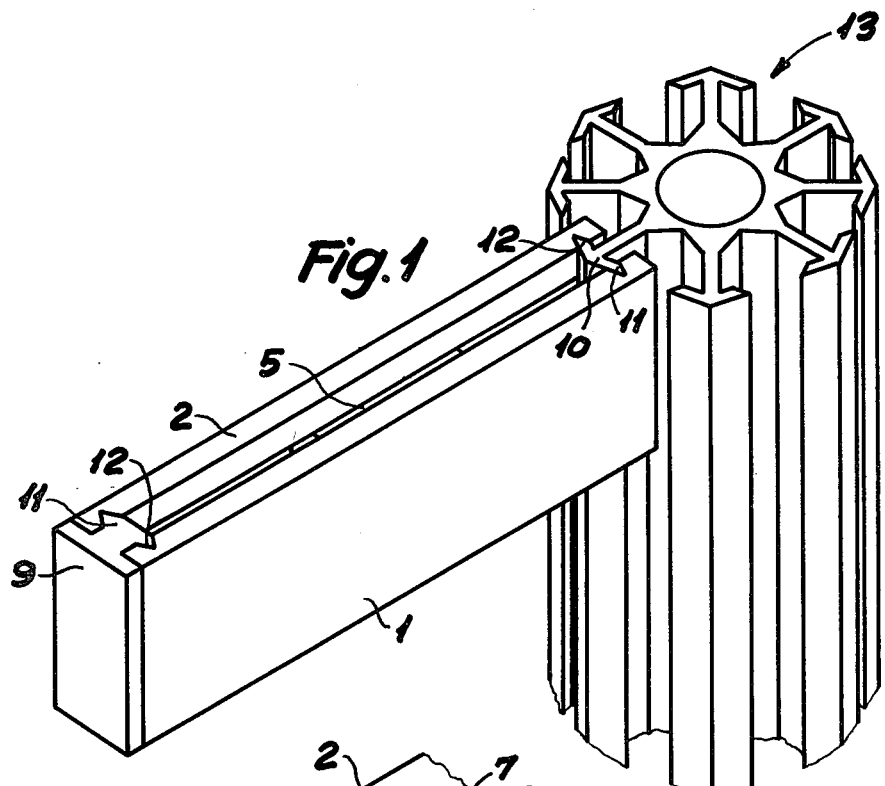

United States Patent [19]

Tollstoff de Voss

[11] Patent Number: 4,458,455
[45] Date of Patent: Jul. 10, 1984

[54] BUILDING-SET FOR THE DISPLAYING OF SIGNS

[76] Inventor: Bjørn Tollstoff de Voss, Lille Fredensvej 8, 2920 Charlottenlund, Denmark

[21] Appl. No.: 328,598
[22] PCT Filed: Apr. 1, 1981
[86] PCT No.: PCT/DK81/00032
  § 371 Date: Nov. 27, 1981
  § 102(e) Date: Nov. 27, 1981
[87] PCT Pub. No.: WO81/02909
  PCT Pub. Date: Oct. 15, 1981

[30] Foreign Application Priority Data

Apr. 2, 1980 [DK] Denmark .............................. 1453/80

[51] Int. Cl.³ ................................................ G09F 7/18
[52] U.S. Cl. ...................................... 52/38; 52/127.11; 52/731; 52/584; 52/40
[58] Field of Search ...................... 52/38, 211, 282, 36, 52/582, 584, 105, 127.11, 731, 239, 40

[56] References Cited

U.S. PATENT DOCUMENTS 3,486,287 12/1969 Guillon .................................. 52/282
3,685,222 8/1972 Curtess ................................... 52/211

FOREIGN PATENT DOCUMENTS 2103502 12/1972 Fed. Rep. of Germany ........ 52/282
2504476 8/1976 Fed. Rep. of Germany ........ 52/282
630113 12/1961 Italy ....................................... 52/282

Primary Examiner—Henry E. Raduazo
Attorney, Agent, or Firm—Lewis H. Eslinger

[57] ABSTRACT

A building set for the setting up of a rectangular, upright plate forming the basis for adhered text comprises: (a) two uniform, rectangular plate sections (1,2) with tracks (3,4), dovetailed in cross-section, on the internal sides facing each other, (b) at least one split locking means (5) whose parts (6 and 7) can be inserted into the tracks (3,4) and, upon displacement transversely to the tracks (3,4), fix by wedge effect the two plate sections (1,2) around (c) a vertical end profile (9,10) at either end of the sign. One or both of the end profiles (10) may form a carrier means (13) for the sign, and said carrier means (13) is capable of carrying several signs. This obviates the problem of disfiguring screws, bolts or the like on the vertical side faces of the plate as the two parts (6 and 7) of the locking means (5) may be mutually displaced transversely to the tracks (3,4) by means of screws which are concealed in the space between the plate sections (1,2).

10 Claims, 3 Drawing Figures

BUILDING-SET FOR THE DISPLAYING OF SIGNS

The invention relates to a building set for the setting up of a rectangular, upright plate, e.g. a panel or a signboard, whose one vertical side face or both of them form the basis for the displaying of signs.

The object of the invention is to provide a building set of the type mentioned above which is simple to assemble without the use of visible screws, bolts or the like which disfigure the vertical side faces of the plate, in particular.

This is achieved according to the invention in that the building set stated above is characterized by the features defined in the characterizing portion of claim 1.

The building set is assembled by joining the two plate sections with the locking means which is inserted into the dovetailed tracks of the plate sections so that each of the two parts of the locking means is disposed in its half of the track in its plate section. Then an end profile is inserted at each end of the plate or the sign. When the two parts of the locking means, e.g. by means of a pointed screw, are urged apart, e.g. with a tool inserted into the space between the plate sections, the plate sections will be clamped to the locking means and also be urged towards each other because of the wedge effect so that the end profiles will be fixed between the plate sections. If the plate has such a size and weight that the friction obtained by the wedge effect is too small to secure the parts of the building set against mutual displacement, several locking means may of course be used, preferably one at either end of the plate. Each plate section may alternatively be shaped with a dovetailed projection or with several dovetailed projections so that these projections will be disposed between two of said tracks. In that case, the corresponding wedge effect may be obtained if the two parts of the locking means are arranged to be urged towards each other, e.g. with a screw, so as to fit tightly around the projection.

One or both of the end profiles may, as stated in claim 2, form a carrier means for the sign. In the first case, a kind of sign column is obtained with a sign pointing in a desired direction, and in the second case, two sign columns with a sign set up between them are obtained.

The features defined in claim 3 provide for a sign column with several signs which may be directed in individually desired directions, e.g. as a signpost.

If it is desired that the sign set up should have a height greater than the feasible extrusion height of the constituent plate sections, two or more signs may, as stated in claim 4, be clamped together in the same plate with one or more additional locking means, which are preferably constructed as stated in claim 5.

The features defined in claim 6 provide a reliably controlled connection between the plate sections and the end profiles.

Figure 2:
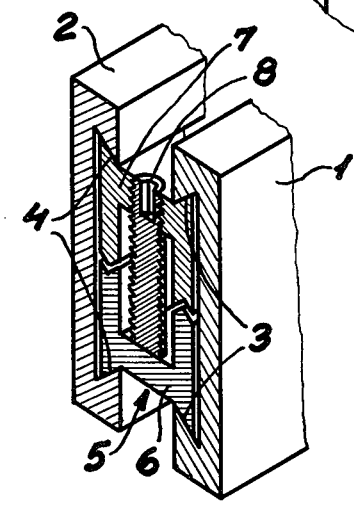
Figure 3:
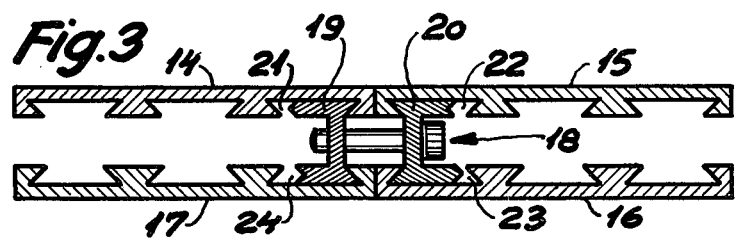

The invention will be explained more fully below with reference to the drawing, in which FIG. 1 is a perspective and partly sectional view of an embodiment of a building set according to the invention, FIG. 2 shows a section of FIG. 1 on a greater scale, and FIG. 3 shows a cross-section of a sign consisting of four joined plate sections.

The building set shown in FIG. 1 and partly in FIG. 2 comprises two uniform, rectangular plate sections 1, 2 which have dovetailed tracks 3, 4 on the internal sides facing each other in the assembled building set, said tracks containing a locking means 5 of similar cross-section.

The locking means 5 comprises two parts 6 and 7 which are mutually slidable transversely to the tracks by means of a pointed screw 8 in the part 7. When the two parts 6 and 7 of the locking means 5 are disposed closely spaced they may be displaced longitudinally of the dovetailed tracks 3, 4, but when the parts 6 and 7 are urged apart transversely to the tracks by means of the pointed screw 8 and a (not shown) screw driver inserted between the plate sections 1 and 2, the parts will be clamped in the dovetailed tracks 3 and 4.

The building set also comprises a vertical end profile 9, 10 at either end of the sign. In the embodiment shown one end profile 9 has the same length as the height of the plate sections 1 and 2 and closes the space between the plate sections 1, 2 at the end in question of the sign, while the other end profile 10 forms a carrier means for the sign as it constitutes a section of an extruded metal profile 13, whose lower end may be imbedded in the ground or a foundation or a floor and thus carry the sign.

Each end profile 9, 10 has a flange 11 engaged with a transverse groove 12 in each plate section. The end profiles have such a width, measured at the flanges 11, that when the plate sections 1, 2 are clamped together by means of the locking means 5, the end profiles will be fixed between these plate sections as a consequence of the wedge effect between the locking means 5 and the dovetailed tracks 3, 4 of the plate sections.

It is evident that the shown octagonal carrier means can carry several signs which may point in up to eight different directions.

When applying a sign over a door and perpendicularly to the wall, an end profile of the type shown to the left in FIG. 1 is used at either end of the sign, and the end profile at the wall is e.g. secured to said wall by through going screws whose heads are concealed between the plate sections 1, 2 when the sign is assembled.

A sign may also be secured between two carrier means 13 of the type shown to the right in FIG. 1 which are then secured in the ground or the floor.

The sign is preferably used as the base or substratum for adhesive letters or symbols, but such letters or symbols may of course instead be embossed on the external sides of the plate sections 1, 2.

Sometimes it is required to use a sign height which is greater than the feasible extrusion width of the plate sections forming part of the sign. To this end, four plate sections 14, 15, 16, 17 may be clamped together with an additional locking means 18 as shown in the cross-section in FIG. 3. This additional locking means 18 is split and shaped in approximately the same way as the locking means 5. The two parts 19 and 20 of the locking means are, however, disposed partly in half of the outer tracks 22 and 23 in the plate sections 15 and 16 and partly in half of the outer tracks 21 and 24 in the plate sections 14 and 17.

The locking means joins these four plate sections 14–17 when its two parts 19 and 20 are moved towards each other transversely to the tracks. This movement is obtained with a screw 24.

It is not always sufficient with a single locking means 5 or perhaps a single additional locking means 18 to obtain the necessary clamping force. In the embodiment in FIG. 1 a locking means 5 may optionally be used at either end of the sign instead of a single locking means in the centre as shown.

The two parts 6 and 7 of the locking means 5 have the configuration shown in FIG. 2 at the edges facing each other so that they can have a controlling effect on each other.

It is evident that the locking means 18 may also be used instead of the locking means 5 if the plate sections are formed with the projections dovetailed in cross-section instead of the dovetailed tracks 3, 4 shown in FIGS. 1 and 2.

The building set may also be used for the manufacturing of furniture. For example, a table may be made by means of four carrier means 13 as legs interconnected with four plates 1, 2 as the frame. A top of a suitable configuration and shape may be secured thereon.

The building set may also be used for the lay-out of premises as the constituent parts may be used for the construction of a framework as the basis for a suitable partitioning.

I claim:

1. A building set comprising:
   two plate members having facing inside surfaces, each of which surfaces has a dovetail portion;
   at least one end member disposed between said surfaces; and
   split locking means for securing said plate members together, said split locking means including two locking members, each of which includes two tongues, both of which tongues cooperate with a dovetail portion in a different said plate member, and a wedging means for urging said locking members transversely of said dovetail portions to force said tongues into said cooperating dovetail portions, wherein the said tongues and dovetail portions have cross-sectional configurations which cooperate to provide a force urging said inside surfaces of said plate members together against said end member therebetween when said locking members are urged transversely of said dovetail portions.

2. A building set as in claim 1; wherein
   said plate members are substantially rectangular with substantially identical dimensions;
   each said dovetail portion includes a female dovetail groove extending along the long dimension of said rectangle; and
   said end member is disposed at the short sides of said rectangles.

3. A building set as in claim 2; wherein the dovetail surfaces of said dovetail grooves are flat, said tongues have flat wedging surfaces for cooperating with said flat dovetail surfaces and said wedging means urges and said locking members apart.

4. A building set as in claim 2; wherein said end member includes a rectangular flat portion having a long side having substantially the same dimension as said short side dimension of said plate members and a short side having a dimension substantially equal to the distance between the outside surfaces of said plate members and a T-shaped portion having a top flange captured in transverse end grooves in said facing inside surfaces of said plate members.

5. A building set as in claim 2; wherein the outside surfaces of said plate members are flat for accepting indicia to serve as sign and said end member comprises a carrier means for said plate members for attachment thereof to adjacent structure.

6. A building set as in claim 5; wherein said carrier means comprises a post for supporting said plate members above a floor.

7. A building set as in claim 6; further comprising two said posts, each of which is disposed at a different end of said plate members.

8. A building set as in claim 6; wherein said post includes at least one axially extending T-shaped portion having the leg thereof disposed radially and the top flange captured in transverse end grooves in said plate members.

9. A building set as in claim 8; wherein said post includes a plurality of said T-shaped portions equally spaced around the periphery of said post for supporting more than one sign.

10. A building set as in claim 2; further comprising at least four said plate members disposed in pairs with the long sides of said pairs in contact, wherein each said tongue of said locking members is disposed in a dovetail groove in a different said plate member and said wedging means urges said locking members together for holding said four plate members together.

* * * * *